United States Patent [19]

Armstrong

[11] 4,014,408
[45] Mar. 29, 1977

[54] VARIABLE-LEVERAGE BRAKES FOR BICYCLES

[76] Inventor: Allen E. Armstrong, 34 Robinson Road, Lexington, Mass. 02173

[22] Filed: Aug. 7, 1975

[21] Appl. No.: 602,668

[52] U.S. Cl. .................... 188/24; 188/2 D; 188/72.9
[51] Int. Cl.² .......................... B62L 1/16
[58] Field of Search ............ 188/2 D, 24, 26, 59, 188/72.9, 71.1, 73.3, 76 R; 192/99 A

[56] References Cited

UNITED STATES PATENTS

| | | | |
|---|---|---|---|
| 3,680,663 | 8/1972 | Kine | 188/72.9 X |
| 3,795,290 | 3/1974 | Hori et al. | 188/72.9 X |
| 3,870,127 | 3/1975 | Wilson et al. | 188/24 |

FOREIGN PATENTS OR APPLICATIONS

| | | | |
|---|---|---|---|
| 265,801 | 3/1966 | Australia | 188/72.9 |
| 1,553,950 | 12/1968 | France | 188/72.9 |
| 1,140,326 | 11/1962 | Germany | 188/72.9 |

*Primary Examiner*—George E. A. Halvosa
*Attorney, Agent, or Firm*—Zalkind & Shuster

[57] ABSTRACT

Multi-stage engagement of a bicycle wheel rim is effected by force simultaneously applied to a slidable caliper and a pivoted caliper causing sequential displacement of the calipers. Displacement of the slidable caliper at a low leverage ratio is terminated by a locking action in response to initial brake contact to cause subsequent pivotal displacement of the pivoted caliper at a high leverage ratio for increased braking contact with the wheel rim.

15 Claims, 9 Drawing Figures

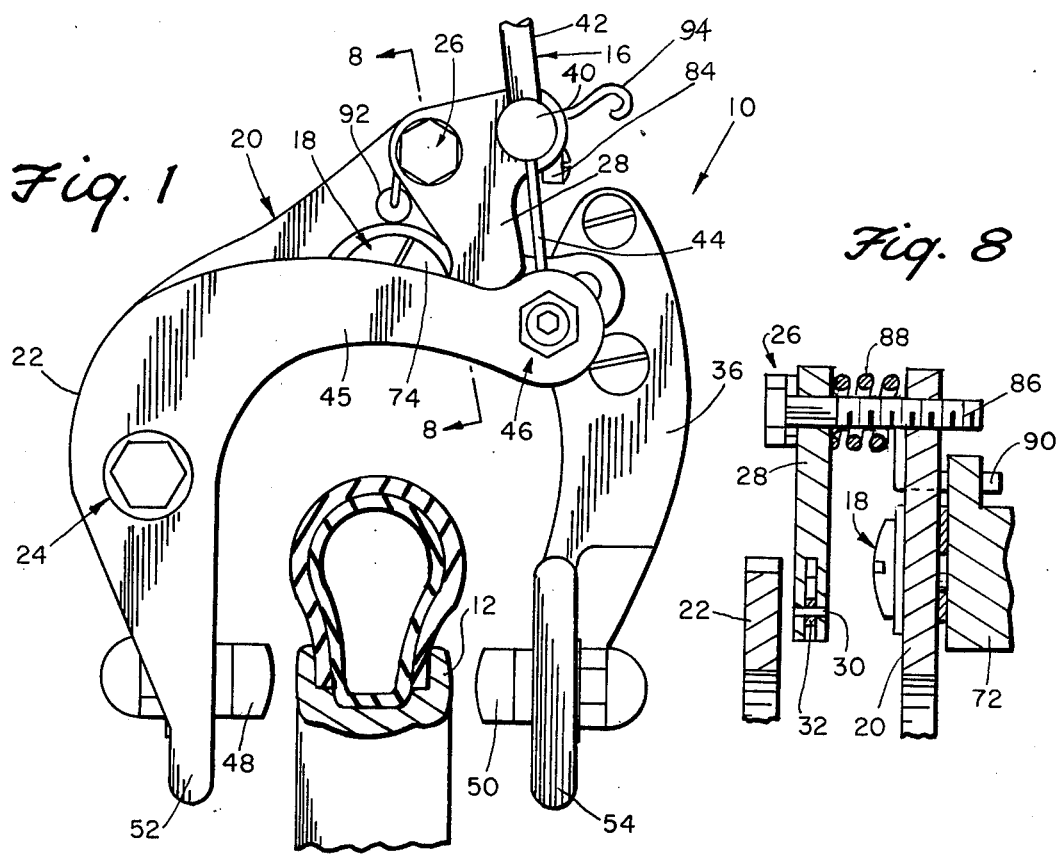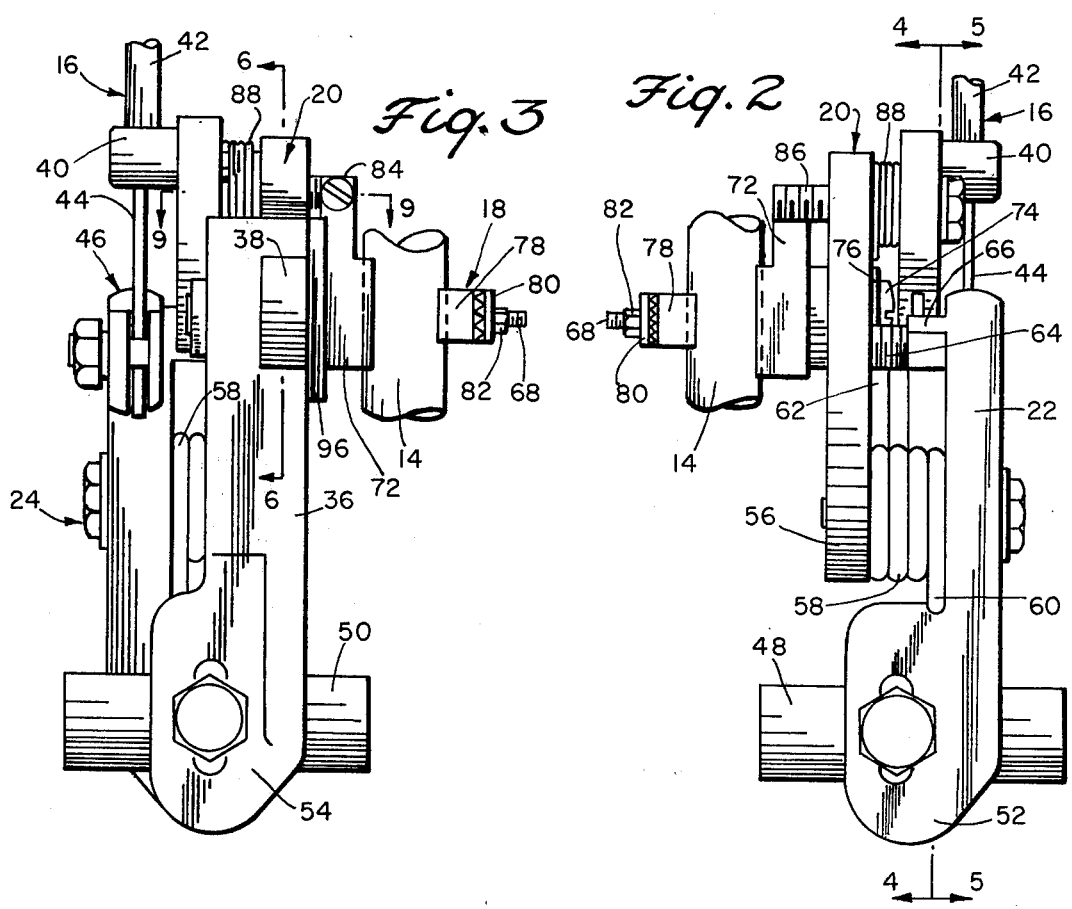

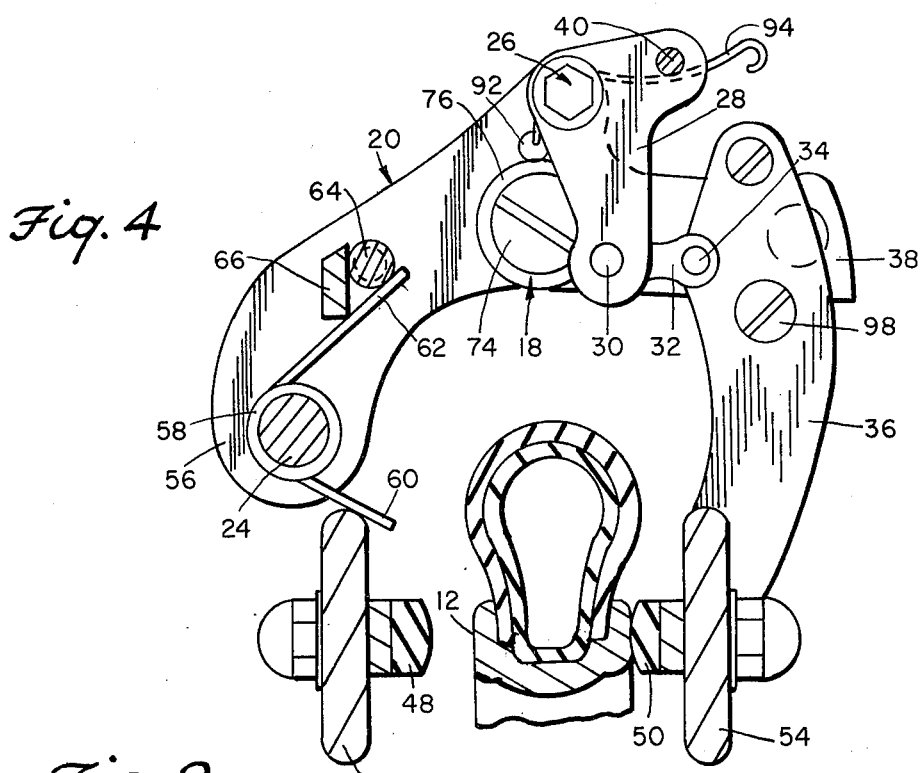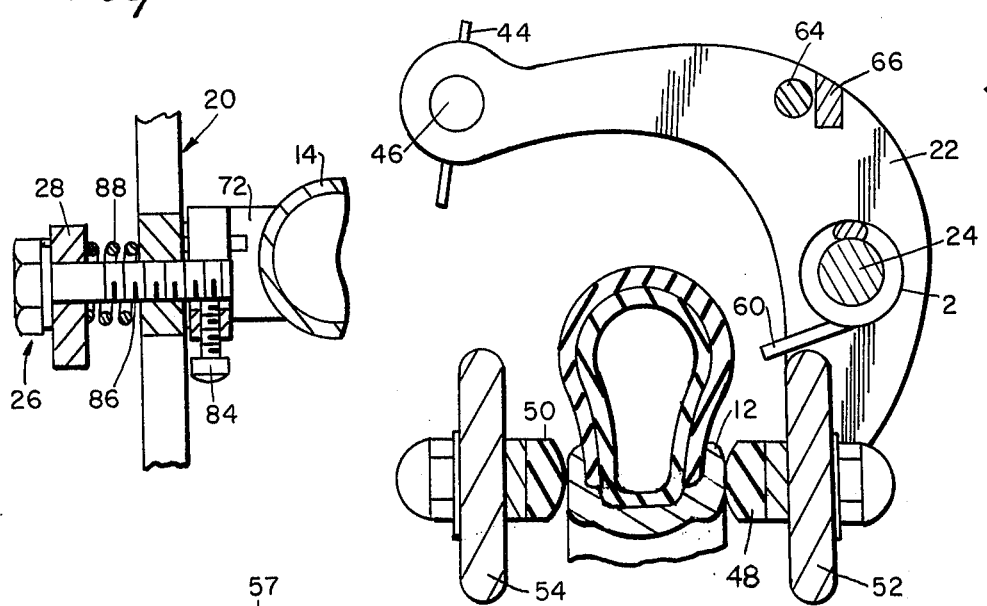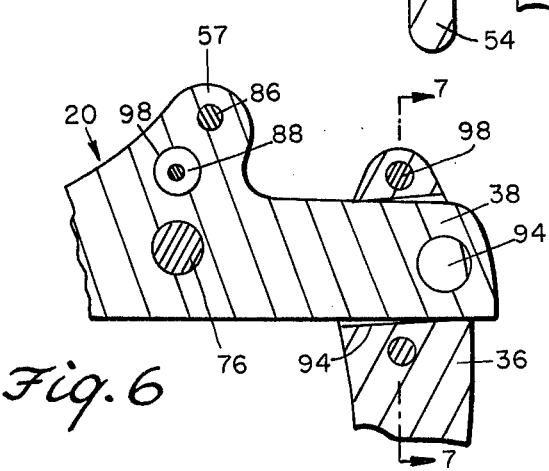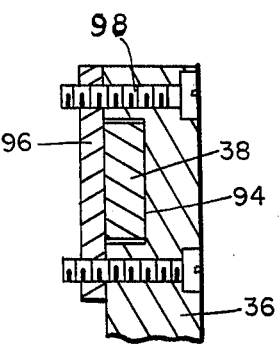

VARIABLE-LEVERAGE BRAKES FOR BICYCLES

BACKGROUND OF THE INVENTION

This invention relates to cable actuated bicycle brakes and is an improvement over the variable leverage caliper brake assembly disclosed in U.S. Pat. No. 3,870,127 to Wilson et al.

The brake assembly disclosed in the aforementioned patent is operative to engage a bicycle wheel rim with brake pads carried on caliper elements, in two stages. During an initial stage, the brake pad attached to the pivoted caliper and the brake pad slidably mounted on the other of the calipers are displaced relative to each other for take-up movement at a low mechanical advantage. In response to brake contact, the slidable caliper is locked against further movement relative to the pivoted caliper resulting in continued braking force being applied at a high mechanical advantage.

The foregoing brake assembly required excessive cable motion during the initial take-up stage and consequently a special hand lever actuator for the Bowden wire cable assembly. Also, cable routing was relatively inconvenient and relatively large and bulky parts were required to obtain the requisite braking pressures. It is therefore an important object of the present invention to provide a variable leverage type of caliper brake assembly having greater design flexibility with respect to braking pressures, cable routing and adjustability. Also, an additional object is to enable use of a standard lever type actuator for the brake assembly.

SUMMARY OF THE INVENTION

In accordance with the present invention, a pivoted caliper element is carried on a pivot yoke member that is in turn pivotally mounted on the bicycle frame. A slidable caliper having a fixed brake pad is also carried by the yoke member for slidable displacement by a bell crank and link establishing vertical routing for a force applying cable assembly having its sheathing pivotally anchored to the bell crank and its actuator cable connected to a long, horizontally extending arm of the pivoted caliper. Force simultaneously transmitted to the calipers by the cable assembly initially displaces the slidable caliper until it is locked in response to brake contact. The pivoted caliper is subsequently displaced relative to its yoke member support at a high leverage ratio. A spring biases the pivoted caliper to a limit position on the yoke member to establish a preload that resists displacement of the pivoted caliper during the initial stage while the slidable caliper is being displaced into contact with the wheel rim. A second spring on the yoke member biases the slidable caliper to its rest position relative to the pivoted caliper.

BRIEF DESCRIPTION OF THE DRAWING FIGURES

FIG. 1 is a front elevation view of the brake assembly in a disengaged condition relative to a bicycle wheel shown in section.

FIG. 2 is a side elevation view of the brake assembly as viewed from one side.

FIG. 3 is a side elevation view of the brake assembly as viewed from the other side.

FIG. 4 is a section view taken substantially through a plane indicated by section 4—4 in FIG. 2, modified to show the brake assembly in an initial stage of engagement.

FIG. 5 is a section view taken substantially through a plane indicated by section line 5—5 in FIG. 2, modified to show the brake assembly in a final stage of engagement.

FIG. 6 is a partial section view taken substantially through a plane indicated by section line 6—6 in FIG. 3, modified to show the locking action following initial brake engagement.

FIG. 7 is a section view taken substantially through a plane indicated by section line 7—7 in FIG. 6.

FIG. 8 is a partial section view taken substantially through a plane indicated by section line 8—8 in FIG. 1.

FIG. 9 is a partial section view taken substantially through a plane indicated by section line 9—9 in FIG. 3.

DETAILED DESCRIPTION OF A SPECIFIC EMBODIMENT

Referring now to the drawings in detail, FIGS. 1, 2 and 3 illustrate a brake assembly generally referred to by reference numeral 10 in operative relationship to a bicycle wheel rim 12. The brake assembly is mounted in this operative position by means of a portion of the bicycle frame 14, as shown in FIGS. 2 and 3. Operation of the brake assembly is effected from a remote location such as the handlebars of the bicycle (not shown) by means of a conventional lever type brake actuator (not shown), which is operatively connected to the brake assembly through a force applying device 16 such as a conventional Bowden wire cable assembly. The brake assembly is mounted on the frame 14 by means of a pivot bolt assembly generally referred to by reference numeral 18.

The pivot bolt assembly 18 pivotally mounts on the frame a yoke lever member generally referred to by reference numeral 20. A first-class lever type caliper 22 is pivotally connected to the yoke member by means of a pivot assembly 24 and is displaceable relative to the yoke member about a movable pivot axis established by the pivot assembly 24, the yoke member 20 itself being pivotally displaceable about an axis fixed to the bicycle frame by means of the pivot bolt assembly 18. Also pivotally connected to the yoke member 20, by means of pivot assembly 26, is a bell crank member 28. A lower arm of the bell crank member is pivotally connected by a pin 30, as more clearly seen in FIG. 4, to one end of a link 32, the other end of the link being connected by a pin 34 to a slidable caliper 36. The yoke member 20 is provided for this purpose with a guide track section 38 on which the caliper is slidably displaced. An upper arm of the bell crank member 28 is provided with a pivoted anchor 40, as more clearly seen in FIG. 1, to which the end of sheathing 42 of the Bowden wire cable assembly 16 is anchored. The slidable cable wire 44 associated with the Bowden wire cable assembly extends from the end of the sheathing 42 and is connected to a long, horizontally extending arm 45 of the pivoted caliper 22 by means of a cable clamp 46. The calipers 22 and 36 are respectively displaced by means of the Bowden wire cable assembly 16 in order to engage brake blocks 48 and 50 with the opposite axial sides of wheel rim 12. The brake blocks 48 and 50 are respectively carried by the lower end portions 52 and 54 of the calipers. The actuating arm 45 of caliper 22 extends across the wheel rim 12 and overlies the caliper 36 as more clearly seen in FIG. 1.

As shown in FIGS. 4 and 6, the yoke member 20 includes a lower arm portion 56 on which the pivot bolt assembly 24 is carried and an upper portion 57 and which the pivot bolt assembly 26 is carried. A torsion spring 58 is mounted on the pivot bolt assembly 24 between the yoke member 20 and the pivoted caliper 22. One end portion 60 of the torsion spring engages the lower portion 52 of the pivoted caliper 22 while the other end portion 62 of the torsion spring engages a stop screw 64 projecting from the yoke member 20 toward the pivoted caliper 22. The stop screw as shown in FIG. 4 is in engagement with an abutment 66. The abutment 66 projects from the pivoted caliper 22 toward the yoke member, as more clearly seen in FIG. 2. It will, therefore, be apparent that the torsion spring 58 exerts a clockwise torque on the pivoted caliper 22 biasing it in a clockwise direction relative to the yoke member 20 as viewed in FIGS. 1 and 4 to a limit position wherein the abutment 66 on the pivoted caliper engages the stop screw 64 projecting from the yoke member.

The yoke member 20, as aforementioned, is pivotally mounted on the bicycle frame by means of the pivot bolt assembly 18, which includes a threaded shank 68 extending through the frame 14. The threaded shank also extends through a spacer block 72, as shown in FIGS. 2 and 3, and terminates in a head 74 abutting washer 76 in contact with the yoke member 20. The pivot bolt assembly 18 holds the yoke member and spacer block 72 assembled on the frame by means of engaged locking elements 78 and 80 and assembly nut 82 as more clearly seen in FIGS. 2 and 3. The spacer block 72, which is rigidly clamped to the bicycle frame 14 by means of the pivot bolt assembly 18, threadedly receives an adjustment screw 84 to engage the threaded shank 86 projecting from the yoke member 20 as more clearly seen in FIG. 9. The threaded shank 86 is associated with the pivot bolt assembly 26 through which the bell crank member 28 is pivotally mounted on the yoke member. The adjustment screw 84, in engaging the threaded shank 86, initially positions the yoke member and the caliper 22 carried thereon to correspondingly establish the initial centered rest positions for the brake blocks 48 and 50 spaced from the wheel rim 12 as shown in FIG. 1.

The pivot screw shank 86, as more clearly seen in FIGS. 8 and 9, extends between the yoke member 20 and bell crank member 28, which are spaced apart on the screw shank 86 by a torsion spring 88. One end portion 90 of the torsion spring 88 extends through an opening 92 in the yoke member and is anchored to the spacer block 72. The other end portion 94 of the torsion spring 88, as more clearly seen in FIG. 4, abuts the pivotal anchor 40 for the Bowden wire sheathing 42. The torsion spring 88, therefore, biases the bell crank member 28 in a counter-clockwise direction relative to the yoke member 20, as viewed in FIGS. 1 and 4. The bell crank member 28, being connected by line 32 to the slidable caliper 36, therefore, urges the slidable caliper in a direction away from the wheel rim 12 to the initial rest position shown in FIG. 1.

As more clearly seen in FIGS. 6 and 7, the track section 38 of the yoke member 20 is slidably received in a recess 94 formed adjacent the upper end of the slidable caliper 36. The track section 38 is retained within the recess 94 by means of a retainer plate 96 secured to the slidable caliper by means of fasteners 98. The track section 38 and recess 94 thus form a sliding joint between the yoke member 20 and slidable caliper 36, which frictionally locks when the slidable caliper 36 is pivotally displaced relative to the yoke member 20, as shown in FIG. 6. As explained in U.S. Pat. No. 3,870,127 aforementioned, the locking action occurs after the brake block 50 contacts the wheel rim as shown in FIG. 5. The preload of torsion spring 58 biasing caliper 22 to its limit position on the yoke member 20, is arranged to be greater than the total force necessary to displace the slidable caliper 36. Accordingly, when the brake is actuated by retracting tension applied to the cable wire of the Bowden wire assembly 16, the slidable caliper 36 initially moves its brake block 50 at a relatively rapid rate into contact with the wheel rim with a correspondingly low mechanical advantage or low leverage ratio. This is occasioned by the transmission of force by cable wire 44 through clamp 46 to the pivoted caliper 22, while a compression force is simultaneously applied by the Bowden wire sheathing 42 to the pivotal anchor 40 on the bell crank member 28. In view of the high preload of tension spring 58, as aforementioned, the bell crank member 28 is initially displaced by the compressive force of the sheathing 42 in a clockwise direction, as viewed in FIGS. 1 and 4 to actuate the slidable caliper while the pivoted caliper 22 remains stationary. After the slidable caliper 36 causes its brake block 50 to contact the wheel rim 12 during a first stage, continued braking force causes yoke member 20 to be displaced by cable wire 44 about pivot bolt assembly 18 as viewed in FIGS. 1 and 4 to thereby bring brake block 48 on the pivoted caliper 22 into contact with the wheel rim 12 during a second stage as shown in FIG. 5. Any further increase in braking force applied to brake block 50 effects the locking of the sliding joint between the slidable caliper 36 and track section 38, as aforementioned. Accordingly, no further displacement of the slidable caliper 36 occurs as the force transmitted by the Bowden wire cable assembly is increased during a third and final stage of engagement. During this final stage, increased force applied through the Bowden wire cable tends to displace pivoted caliper 22 counter-clockwise on the yoke member against the bias of spring 58, as viewed in FIGS. 1 and 4, applying a braking force through brake block 48 at a high mechanical advantage or leverage ratio. When the braking force applied is released, the calipers 22 and 36 return to their initial rest positions under bias of springs 58 and 88. The initial rest position for the yoke member 20 is established by the adjustment screw 84 abutting the screw shank 86, while the initial rest position of the pivoted caliper 22 is established by its abutment 66 engaging the stop screw 64 on the yoke member.

The bell crank member 28 having an arm-length ratio of approximately two-to-one, is operative with relatively small cable motion of the Bowden wire cable assembly thereby enabling use of a standard hand-lever type of brake actuator and more convenient cable routing to the hand-lever actuator. Improved vertical cable routing for the Bowden wire cable assembly relative to the brake assembly is also made possible by the configuration of the high leverage caliper 22 and the horizontal positioning of its longer operating arm 45 with an overall reduction in the size of the brake assembly.

I claim:
1. In combination with a force applying device, a brake assembly for an element rotatably mounted on a frame, comprising a pair of calipers, brake pads fixed to the calipers and engageable with said rotatable ele- ment, linkage means separately connected to the calipers for pivotal displacement thereof relative to each other by the force applying device, guide track means connected to said linkage means for slidably guiding movement of one of the calipers, and force transmitting means connecting the force applying device to the linkage means and the other of the calipers for sequentially displacing the calipers relative to the element at different leverage ratios.

2. The combination of claim 1, including lock means responsive to engagement of said one of the calipers with said rotatable element for preventing further displacement of said one of the calipers relative to the guide means.

3. The combination of claim 1, wherein said linkage means includes a pivot member to which the guide means is connected, means pivotally mounting the pivot member about a pivotal axis fixed to the frame, a bell crank element pivotally connected to the pivot member, a link connecting the bell crank element to said one of the calipers, and means pivotally connecting the other of the calipers to the pivot member.

4. The combination of claim 3, wherein said force applying device includes a sheathing and an actuator cable slidable therein, said force transmitting means comprising means connecting the actuator cable to the pivot member, and means pivotally anchoring the sheathing to the bell crank element.

5. The combination of claim 1, wherein said other of the calipers is a first-class lever having relatively short and long arms, the force applying device being connected to one of said arms.

6. The combination of claim 5, including preload means resisting said pivotal displacement of said other of the calipers by the force applying device for initially effecting displacement of said one of the calipers on the guide means in response to force applied to the calipers through the force transmitting means.

7. The combination of claim 1, including preload means resisting said pivotal displacement of said other of the calipers by the force applying device for initially effecting displacement of said one of the calipers on the guide means in response to force applied to the calipers through the force transmitting means.

8. In combination with a force applying device, a brake assembly for an element rotatably mounted on a frame, comprising a pair of calipers, brake pads fixed to the calipers and engageable with said rotatable element, linkage means connected to the calipers for displacement by the force applying device, guide means connected to said linkage means for guiding movement of one of the calipers, force transmitting means connecting the force applying device to the linkage means and the other of the calipers for sequentially displacing the calipers relative to the element at different leverage ratios, and lock means responsive to engagement of said one of the calipers with said rotatable element for preventing further displacement of said one of the calipers relative to the guide means, said linkage means including a pivot member to which the guide means is connected, means pivotally mounting the pivot member about a pivotal axis fixed to the frame, a bell crank element pivotally connected to the pivot member, a link connecting the bell crank element to said one of the calipers, and means pivotally connecting the other of the calipers to the pivot member.

9. The combination of claim 8, wherein said force applying device includes a sheathing and an actuator cable slidable therein, said force transmitting means comprising means connecting the actuator cable to the other of the calipers, and means pivotally anchoring the sheathing to the bell crank element.

10. The combination of claim 9 including preload means biasing the other of the calipers to a limit position relative to the pivot member for preventing displacement of said other of the calipers during an initial stage of brake engagement at a lower one of said different leverage ratios.

11. The combination of claim 10, including abutment means mounted by the pivot member and said other of the calipers for establishing said limit position from which the other of the calipers is displaced at a higher one of the different leverage ratios during a final stage of brake engagement.

12. The combination of claim 8 including preload means biasing the other of the calipers to a limit position relative to the pivot member for preventing displacement of said other of the calipers during an initial stage of brake engagement at a lower one of said different leverage ratios.

13. The combination of claim 12, including abutment means mounted by the lever member and said other of the calipers for establishing said limit position from which the other of the calipers is displaced at a higher one of the different leverage ratios during a final stage of brake engagement.

14. In combination with a force applying device, a brake assembly for an element rotatably mounted on a frame, comprising a pair of calipers, brake pads fixed to the calipers and engageable with said rotatable element, linkage means connected to the calipers for displacement by the force applying device, guide means connected to said linkage means for guiding movement of one of the calipers, force transmitting means connecting the force applying device to the linkage means and the other of the calipers for sequentially displacing the calipers relative to the element at different leverage ratios, said linkage means including a pivot member to which the guide means is connected, means pivotally mounting the pivot member about a pivotal axis fixed to the frame, a bell crank element pivotally connected to the pivot member, a link connecting the bell crank element to said one of the calipers, means pivotally connecting the other of the calipers to the pivot member, said force applying device including a sheathing and an actuator cable slideable therein, said force transmitting means comprising means connecting the actuator cable to the other of the calipers, means pivotally anchoring the sheathing to the bell crank element, and preload means biasing the other of the calipers to a limit position relative to the pivot member for preventing displacement of said other of the calipers during an initial stage of brake engagement at a lower end of said different leverage ratios.

15. The combination of claim 14 including abutment means mounted by the lever member and said other of the calipers for establishing said limit position from which the other of the calipers is displaced at a higher one of the different leverage ratios during a final stage of brake engagement.

* * * * *